B. J. MOSS.
ATTACHMENT FOR MEAT GRINDERS.
APPLICATION FILED MAY 25, 1917.
1,235,995.
Patented Aug. 7, 1917.
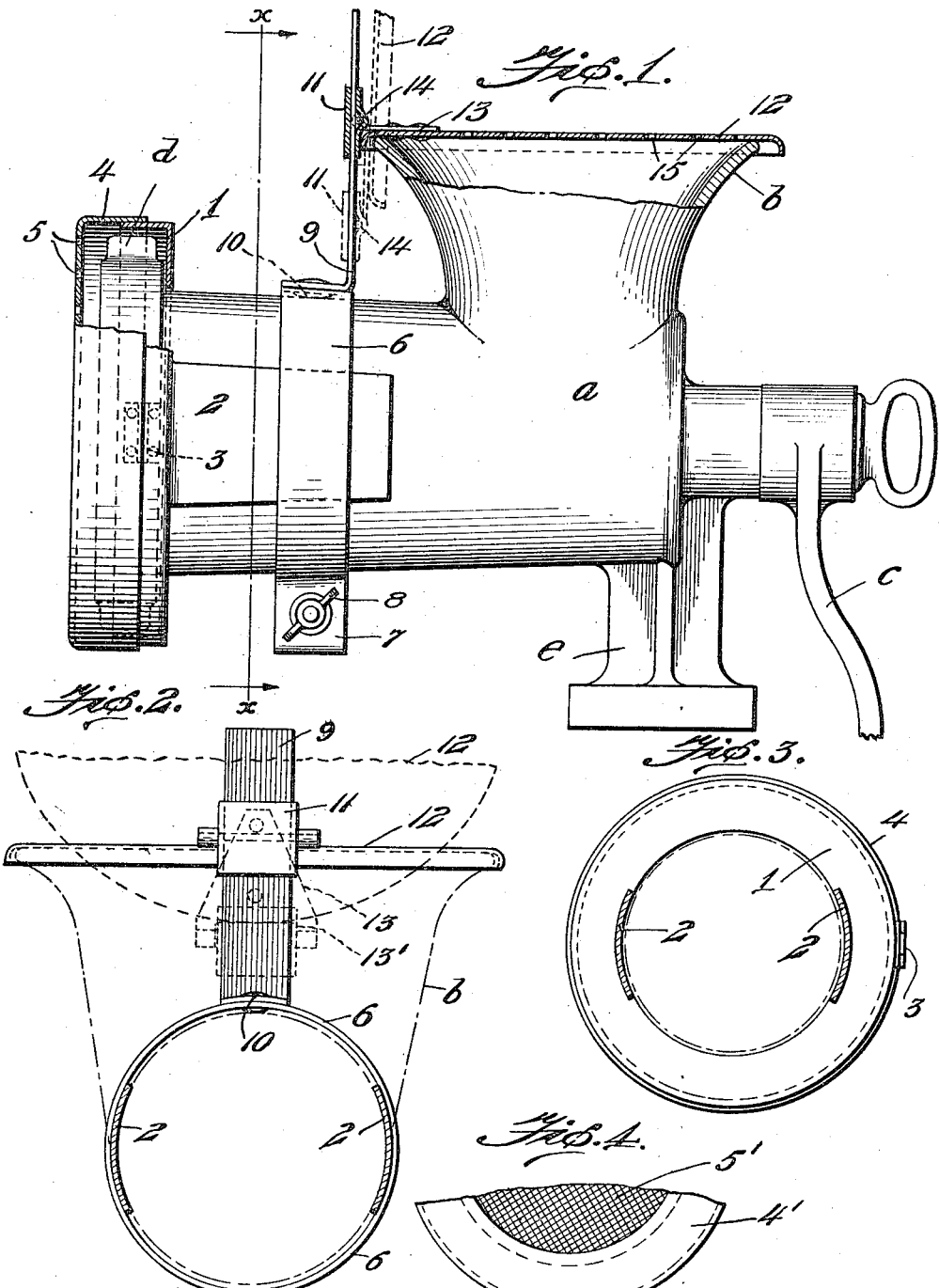

UNITED STATES PATENT OFFICE.

BENJAMIN J. MOSS, OF BALTIMORE, MARYLAND.

ATTACHMENT FOR MEAT-GRINDERS.

1,235,995.　　　　　　Specification of Letters Patent.　　　Patented Aug. 7, 1917.

Application filed May 25, 1917. Serial No. 170,828.

*To all whom it may concern:*

Be it known that I, BENJAMIN J. MOSS, also known as BENJAMIN J. MOZIKOW, who has declared his intention to become a citizen of the United States, residing at Baltimore, in the county of Baltimore City and State of Maryland, have invented certain new and useful Improvements in Attachments for Meat-Grinders; and I do hereby declare the following to be a full, clear, and exact description of the invention, such as will enable others skilled in the art to which it appertains to make and use the same.

This invention relates generally to attachments for that class of devices known as food or meat choppers.

The invention is intended to provide a casing or covering for the ordinary type of chopper or grinder, which is adapted to keep out the dirt and particularly the flies which have made the use of these devices most undesirable.

Particularly during the cutting or grinding operation it has been found that the flies gather about the hopper mouth and are carried along with the meat when it is pushed down into the feed worm so that they are ground or cut up with the meat. The present device provides a means for eliminating this obnoxious feature, in that there is provided a closure for the hopper mouth which has a most convenient mounting whereby the same may be swung to an out of the way position by a slight movement, and when the feeding operation is completed may be swung back to closed position to exclude foreign substances and germ carrying objects.

In the drawings, Figure 1 is a side elevation showing the usual meat chopping device provided with the sanitary attachment;

Fig. 2 is a section on line *x—x* of Fig. 1, looking in the direction of the arrows;

Fig. 3 is a section on the same line looking in the other direction; and

Fig. 4 is a detailed view of another form of the top plate 12 or the end cap 4.

Referring to the drawings, in which corresponding reference numerals indicate similar parts, the main body of the cutter $a$ which rests on the support or base $e$ has the usual bell-shaped hopper $b$ into which the meat is fed by hand from whence it is carried by the usual feed worm (not shown) and operated by motive power or the handle $c$ to the cutting end of the device which as shown is provided with the usual collar $d$ surrounding the usual cutting member and strainer plate (not shown). Since the foregoing description applies to the ordinary type of meat cutter, no attempt has been made to show the interior construction thereof. The attachment as applied thereto will now be described, it being understood that the same is composed of any suitable material but preferably of sheet metal.

Adapted to inclose the collar $d$ peripherally and at one end, is the protective casing 1 consisting of a sleeve peripherally surrounding the same and provided with a flange which extends inwardly and fits snugly to the longitudinal cylinder of the meat cutter. Attached to or made integral with the casing 1 and extending longitudinally of the cylinder are the adjusting ears 2, the function of which will be hereinafter described. The casing 1 is preferably provided at one side of the barrel of the cutter with a hinge 3 to which is attached the strainer plate inclosing cap 4, provided with a flange overlapping the casing 1 thereby making a snug fit. As desired this cap may or may not be provided with ventilation openings such as 5, and may have the hinge 3 omitted or be detachably connected to said casing 1 in any other suitable manner such as by threading thereon.

Surrounding the barrel or cylinder of the cutter is a longitudinally adjustable standard for the hopper cover. In the present embodiment the same is shown as a circular band 6 provided with any desired means for adjusting and securing it in such position on the barrel, such as the flanges 7 through which passes a fastening bolt on which threads the winged nut 8.

Riveted or otherwise secured as at 10 to the top of the band 6 or made integral therewith is the support or upright 9 adapted to slidably receive the block or hinge member 11 which is bulged slightly to receive the hinge pin 14. Adapted to cover the bell mouth of the hopper is the plate 12 to which is secured a hinge member 13, having a bifurcation at its free end to straddle the block 11 and hinge to the pin 14 whereby as the block is raised or lowered the hinge construction will allow the cover 12 to swing upwardly, as indicated in dotted lines in Fig. 1, to an open position so that the meat or other substance may be pushed into the hopper. It is within the scope of this invention to provide any type of hinge connection between the cover 12 and the upright 9, which will permit the cover to swing to an open position to permit the insertion of the substance to be cut.

If desired, the top 12 may also be provided with ventilation holes 15. In Fig. 4 is shown a modification of the top 12 and also the end cap 4, provided with wire or other mesh screen to keep out the dirt and flies but permit the air to have access to the interior of the grinder or cutter. But obviously it is within the scope of the invention to have these closures made without the openings.

As shown in the drawings, the band 6 encircles the ears 2, which construction permits of an adjustment of the casing 1 in respect to the collar $d$ and at the same time assists in securing the same in place on the barrel. It will be also seen that by means of this arrangement the collar 6 itself is free to be adjusted longitudinally of the cylinder.

It is to be understood that the invention is not to be limited to the precise construction and combination of devices herein shown and described, as it is evident that modifications may be made therein within the scope of the appended claims.

Having thus described the invention, what is claimed as new and desired to be secured by Letters Patent is:

1. An attachment for a device of the character described, comprising a closure adapted to cover the mouth of the feed hopper, a support therefor longitudinally adjustable on the feed barrel of said device, and means connecting said closure to said support whereby the former may be swung to open position.

2. A support adapted to be mounted on the feed cylinder of a meat cutter, a hinge member slidably mounted thereon, a cover connected to said hinge member whereby as the cover is raised to open position the hinge member is slidingly lowered on the support.

3. A support adapted to be attached to a machine of the character described, a cover adapted in one position to close the mouth of the feed hopper thereof and means for connecting said cover to said support movable to permit the former to move downwardly alongside the hopper mouth and be supported in open position.

4. An attachment for a meat cutting machine comprising a casing adapted to inclose the delivery end of the device, a removable cap for said casing, ears connected to said casing, a cover support adapted to embrace said ears and the barrel of the device, and a cover for the meat hopper hingedly mounted on said support.

5. An attachment for a device of the character described, a casing for the strainer end of the meat cutter, a removable cap therefor, means connected to said casing for holding the same in position on the device, said means including a cover support, and a cover for the meat hopper connected to said support.

In testimony whereof I affix my signature in the presence of two witnesses.

BENJAMIN J. MOSS.

Witnesses:
RALPH MOSS,
WILLIAM E. SCHUL.

Copies of this patent may be obtained for five cents each, by addressing the "Commissioner of Patents, Washington, D. C."